(12) United States Patent
Takeda et al.

(10) Patent No.: US 6,952,565 B1
(45) Date of Patent: Oct. 4, 2005

(54) COMMUNICATION TERMINAL, AUTOMOBILE COMMUNICATION TERMINAL, AND AUTOMOBILE

(75) Inventors: Eriko Takeda, Tokyo (JP); Kiichi Yamashita, Kagoshima (JP); Kenji Sekine, Hinode (JP); Ken Takei, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/110,345

(22) PCT Filed: Oct. 13, 1999

(86) PCT No.: PCT/JP99/05634

§ 371 (c)(1),
(2), (4) Date: Apr. 11, 2002

(87) PCT Pub. No.: WO01/28113

PCT Pub. Date: Apr. 19, 2001

(51) Int. Cl.$^7$ ................................. H04B 1/40
(52) U.S. Cl. ................. 455/84; 455/107; 455/125; 455/182.3; 333/17.3; 333/124
(58) Field of Search .................. 455/182.3, 184.1, 455/192.3, 193.1, 107, 125, 84, 85, 86, 87; 333/124, 17.3

(56) References Cited

U.S. PATENT DOCUMENTS 3,842,358 A * 10/1974 Frazier .................. 324/140 D
4,462,009 A * 7/1984 Landt et al. ............... 333/17.1

FOREIGN PATENT DOCUMENTS

| JP | 3-17482 | 6/1989 |
| JP | 3-74909 | 8/1989 |
| JP | 3-119836 | 10/1989 |
| JP | 5-314330 | 5/1992 |
| JP | 9-270630 | 3/1996 |

OTHER PUBLICATIONS

International Search Report from Japanese Patent Office dated Dec. 28, 1999.

* cited by examiner

Primary Examiner—Lee Nguyen
(74) Attorney, Agent, or Firm—Reed Smith LLP; Stanley P. Fisher, Esq.; Juan Carlos A. Marquez, Esq.

(57) ABSTRACT

The present invention provides a communication terminal that enables precise communications with optimum receive sensitivity at any time regardless of any change in peripheral environments of an antenna thereof. The communication terminal including means for transmitting and receiving radio waves is provided with a training mechanism for enabling the communication terminal itself to conduct training mode for tuning receive sensitivity, and switching mechanism for switching between normal communication mode and the training mode. The communication terminal is particularly useful as a communication terminal for automobile in the Intelligent Transport System or the like.

25 Claims, 13 Drawing Sheets

COMMUNICATION TERMINAL, AUTOMOBILE COMMUNICATION TERMINAL, AND AUTOMOBILE

BACKGROUND OF THE INVENTION

The present invention relates to a communication terminal and more particularly to a communication terminal for automobile used in the Intelligent Transport System (ITS) or the like.

Presently, a study is being made of various wireless services such as ITS. For these services to be versatile requires that highly efficient, inexpensive communication terminals be provided. ITS includes the Electric Toll Collection System (ETC) that uses radio waves of, e.g., 5.8 GHz band to wirelessly collect turnpike tolls, the Road/Automobile Communication System, and the like. ETC and the Road/Automobile Communication System require highly precise communications because the former must correctly collect tolls and the latter must correctly exchange large volumes of information. These terminals are installed with an antenna thereof located inside an automobile or outside it. Locating the antenna outside an automobile requires environmental measures such as dust prevention and rain protection, probably bringing about higher communication terminal costs. On the other hand, in the case where the antenna is located inside the automobile, although the above problem is solved, even if the communication terminals are designed so that antenna impedance matches air impedance, antenna impedance changes depending on installation conditions because matters other than air such as front glass exist in the vicinity of an antenna radiation surface in real environments. As a result, reflection due to impedance mismatch occurs between the antenna and a transmitter-receiver, reducing communication precision. To avoid this, measures are required against loss in the front glass and impedance mismatch between the antenna and transmitter-receiver. The configuration of a communication antenna considering changes in antenna impedance due to front glass for an antenna located inside an automobile is disclosed in, e.g., Japanese Patent Application Laid-Open No. H5-314330 "Noncontact IC Card Mounting Apparatus". This employs-a method as shown in FIG. 18. That is, a noncontact IC card 204 is attached to front glass 202 by using a mounting apparatus 200, a dielectric member 203 is inserted between the front glass 201 and the antenna 202, and impedance between the antenna 202 and the front glass 201 is matched by the dielectric constant and thickness of the dielectric member 203.

Although the prior art provides impedance matching by inserting a dielectric member for impedance tuning between the antenna and the front glass, this method has a problem in that different dielectric members must be used depending on the thickness and material of the front glass of the automobile. Also, the need to attach the antenna to the front glass limits the freedom to install the communication terminal in any location.

SUMMARY OF THE INVENTION

An object of the present invention is to provide a communication terminal, particularly a communication terminal for automobile used in ITS and the like that solves the problems of the prior art, can always keep impedance matching between an antenna and a transmitter-receiver in the best condition, and incorporates a training mechanism for conducting training mode for tuning receive sensitivity.

Another object of the present invention is to provide a communication terminal that can be installed in any-location by a user, can be used for all automobiles and all models of automobiles, and enables highly precise communications.

A communication terminal of the present invention comprises transmit/receive means for exchanging information about toll collection between tollgates placed on a highway and an automobile, or normal transmit/receive means such as transmit/receive means for exchanging information between the automobile and communication units provided on roads, and training mechanism that enables the terminal itself to best tune receive sensitivity. In a communication terminal of the present invention, for example, receive sensitivity can be tuned by being automatically set to training mode when power to the terminal is turned on. Also, the terminal can automatically switch to normal communication mode after the tuning of receive sensitivity terminates.

Training for receive sensitivity tuning can be achieved by the following two types of methods. As a first method, in the case where an impedance tuning circuit is provided between an antenna and a transmitter-receiver, a reflection signal level at an input end of the impedance tuning circuit is set to the smallest or a level equal to or less than a predetermined tolerance value, or in the case where an antenna whose impedance can be tuned is provided, a reflection signal level at an input end of the antenna is set to the smallest or a level equal to or less than a predetermined tolerance value. At first, a transmission wave for detecting a reflection signal level is transmitted from a transmitter and a reflection signal level is detected at an input end of the impedance tuning circuit or an input end of the antenna. Next, impedance of the impedance tuning circuit or impedance of the antenna is tuned based on the reflection signal level so as to bring the reflection signal level into the smallest or a level equal to or less than a predetermined tolerance value. Upon termination of the series of operations in the training mode, the terminal is switched to normal communication mode.

As a second method, impedance of the impedance tuning circuit or impedance of the antenna is tuned so as to bring a receive signal level of the antenna into the largest or a level equal to or greater than a predetermined tolerance value. A transmission wave for detecting a receive signal level of the antenna is transmitted to detect a receive signal level of the antenna. Next, impedance of the impedance tuning circuit or impedance of the antenna is tuned based on the receive signal level so as to bring the receive signal level into the largest or a level equal to or greater than a predetermined tolerance value. Upon termination of the series of operations in the training mode, the terminal is switched to normal communication mode.

In the training mode by the above described method, preferably, a signal of the same frequency as a receive frequency in normal communication mode is used as a transmission wave.

DETAILED DESCRIPTION OF THE PREFERRED EMBODIMENTS

Figure 1:
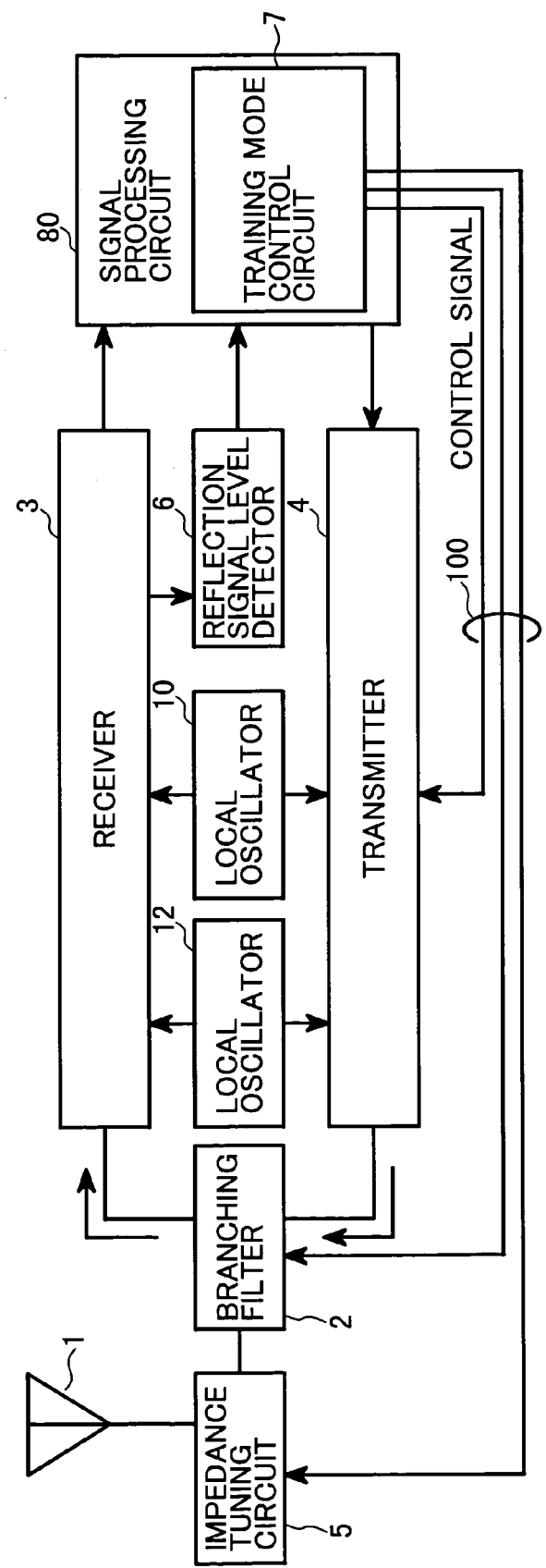
FIG. 1 is a block diagram showing a basic configuration of the present invention.

Hereinafter, embodiments of the present invention will be described in detail with reference to the accompanying drawings. In all drawings for explaining embodiments, components having identical functions are assigned identical reference numerals to avoid duplicate descriptions.

A communication terminal of the present invention has a training means for allowing the communication terminal itself to tune receive sensitivity. FIG. 1 is a block diagram showing a basic configuration of the present invention. A transmitter-receiver comprises an antenna 1 for transmission and reception, a branching filter 2, a receiver 3, a transmitter 4, a local oscillator 10, a local oscillator 12, and a signal processing circuit 80. To achieve objects of the present invention, the transmitter-receiver is provided with a reflection signal level detector 6 that can detect and tune a reflection signal level, an impedance tuning circuit 5, and a training mode control circuit 7.

Figure 2:
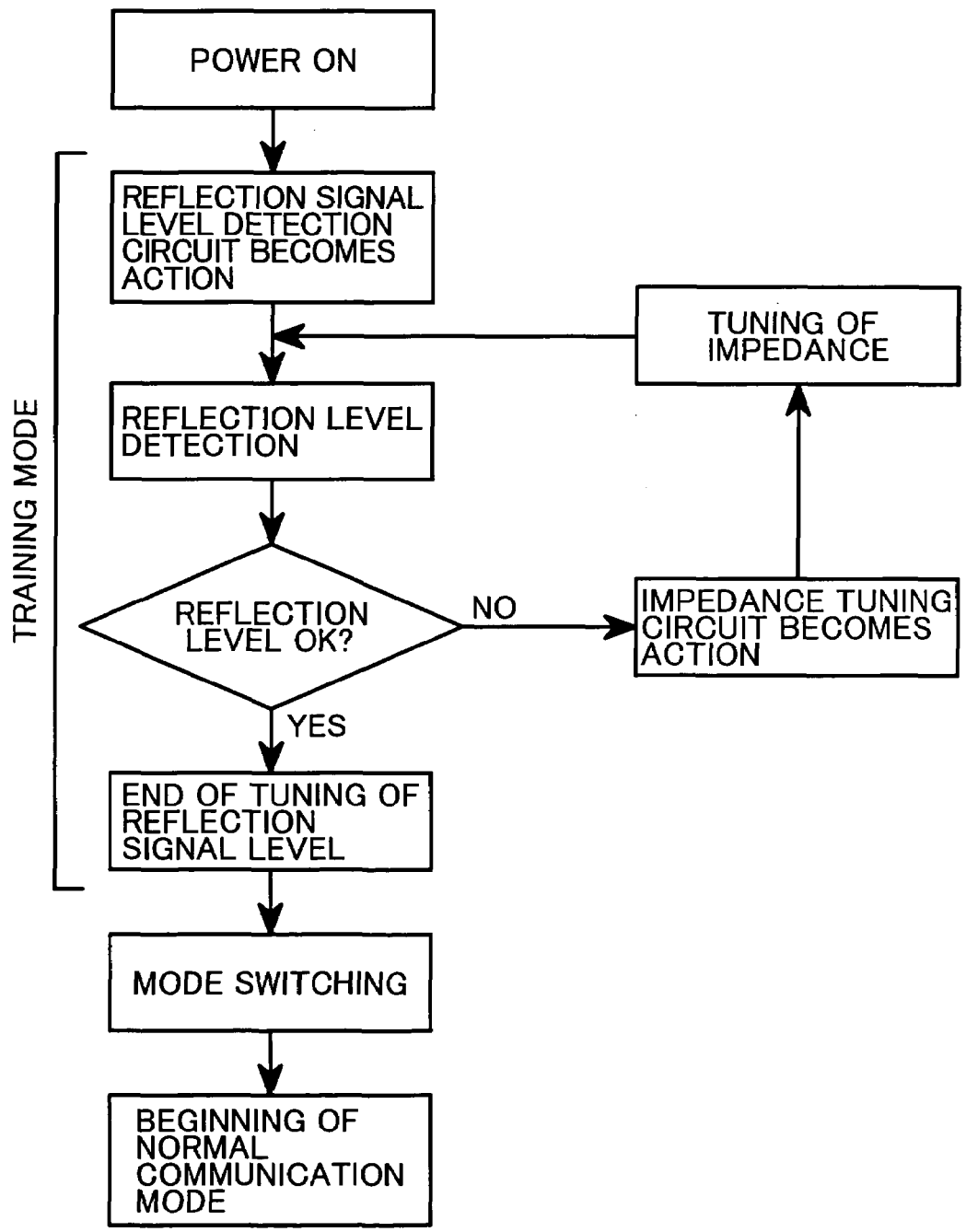
FIGS. 2 to 4 are respectively diagrams showing an operation flow of a communication terminal of the present invention.

Next, the operation of the communication terminal is described using FIGS. 1 and 2. For example, when the communication terminal is powered on, the reflection signal level detector 6 is activated to detect a reflection signal level from the impedance tuning circuit 5. A signal level detected by the reflection signal level detector 6 is compared with a reference value set in advance in the training mode control circuit 7, which is the smallest reflection signal level or a level equal to or less than a predetermined tolerance value, so that a control signal is produced according to the level. The control signal is transferred through a control line 100 to the impedance tuning circuit 5, where impedance is tuned. This operation is repeated until a reflection signal level reaches a desired reference value, at which time a control state is fixed and stored in a microcomputer incorporated in the training mode control circuit 7. After termination of the series of operations, switching is made to a normal communication mode by the training mode control circuit 7.

Alternatively, the communication terminal may be configured as follows. That is, when the communication terminal is powered on, the reflection signal level detector 6, the training mode control circuit 7, and the impedance tuning circuit 5 are activated, and in response to a signal from the training mode control circuit 7, the impedance tuning circuit 5 gradually changes the value of impedance within a variable range, detects a reflection signal level by the reflection signal level detector 6 each time impedance changes, and stores the values of reflection signal level and impedance in the microcomputer incorporated in the training mode control circuit 7. After termination of the series of operations, the value of impedance at the smallest of reflection signal levels stored in the microcomputer or a reflection signal level equal to or less than a predetermined tolerance value is read, and the training mode control circuit 7 controls the impedance tuning circuit 5 so as to perform setting by that value. After termination of the training operation, switching is made to a normal communication mode by the training mode control circuit 7.

In this way, in this embodiment, in, e.g., ETC, since receive sensitivity is tuned by tuning a reflection signal level before commencing communications with a main unit actually installed in a toll booth, highly precise communications with the main unit can be conducted at any time.

Figure 3:
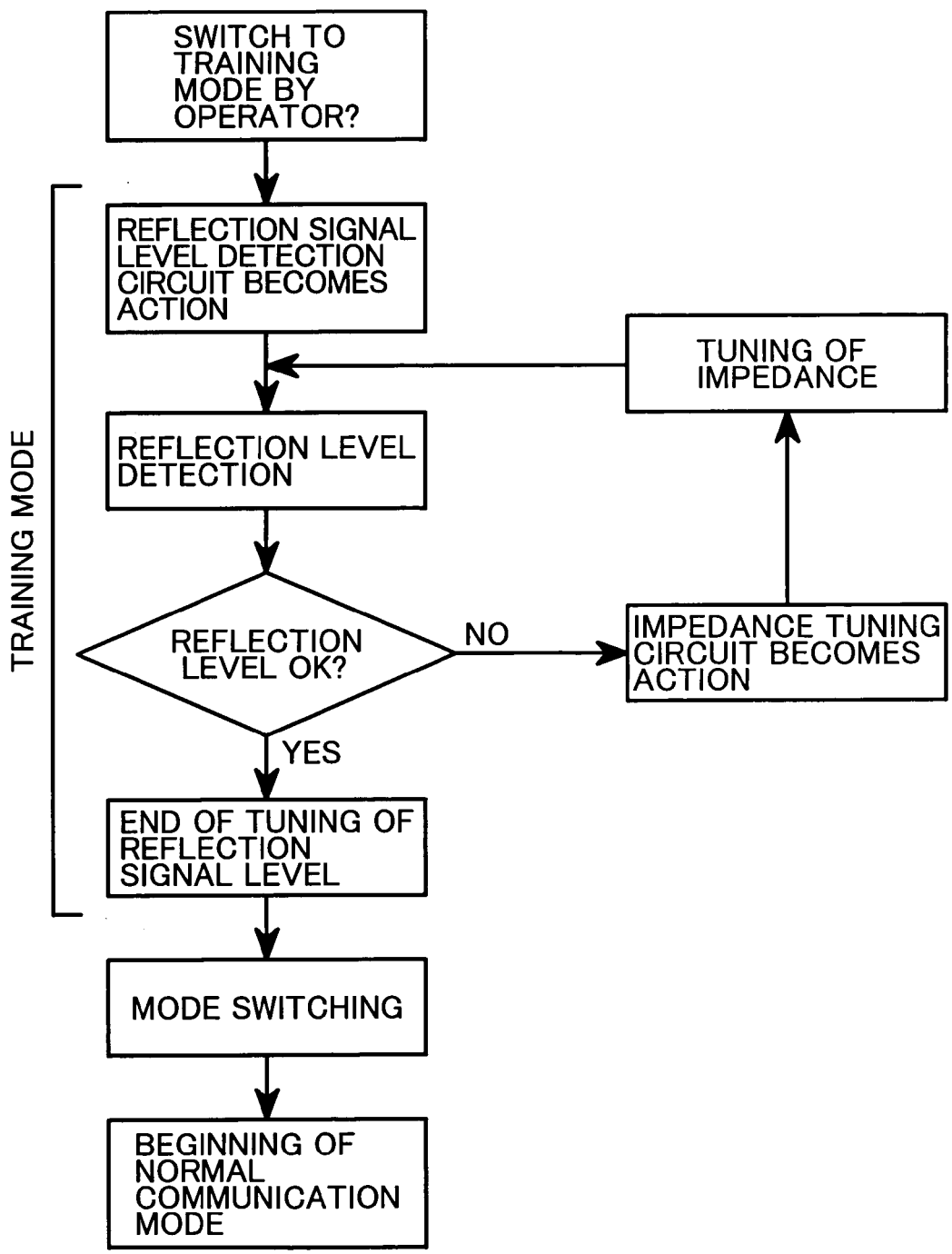

Although, in the above described embodiment, the control circuit is configured to automatically tune a reflection signal level after power is turned on, it goes without saying that the present invention can be modified in various ways without departing from the spirit and scope of the present invention. For example, as in a flowchart shown in FIG. 3, a communication terminal may be provided with a switch or button for switching between a reflection signal level tuning means and a normal transmitting/receiving means so that the user switches modes by the switch or button.

Figure 4:
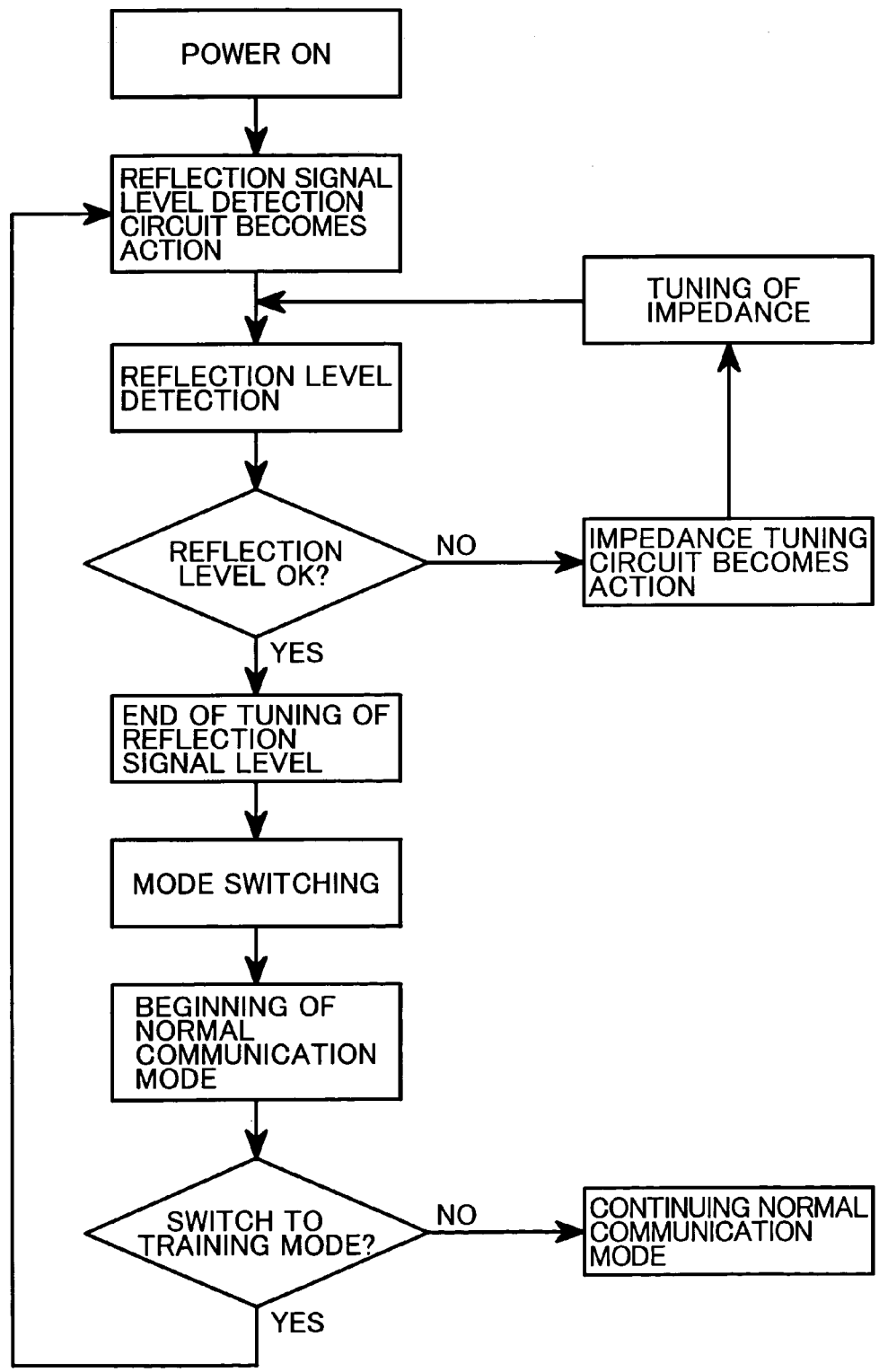

As shown in FIG. 4, the communication terminal may be configured to operate with the two above described methods combined. In other words, not only a reflection signal level is automatically adjusted after the communication terminal is powered on, but also when the communication terminal user wants to tune a reflection signal level, modes may be switched by the above described switch or button to activate the reflection signal level tuning means. Furthermore, the reflection signal level tuning means may be activated every given time period. A transmission level when the communication terminal is operating may be set lower than that in the normal communication mode by a command signal of the training mode control circuit 7.

Figure 5:
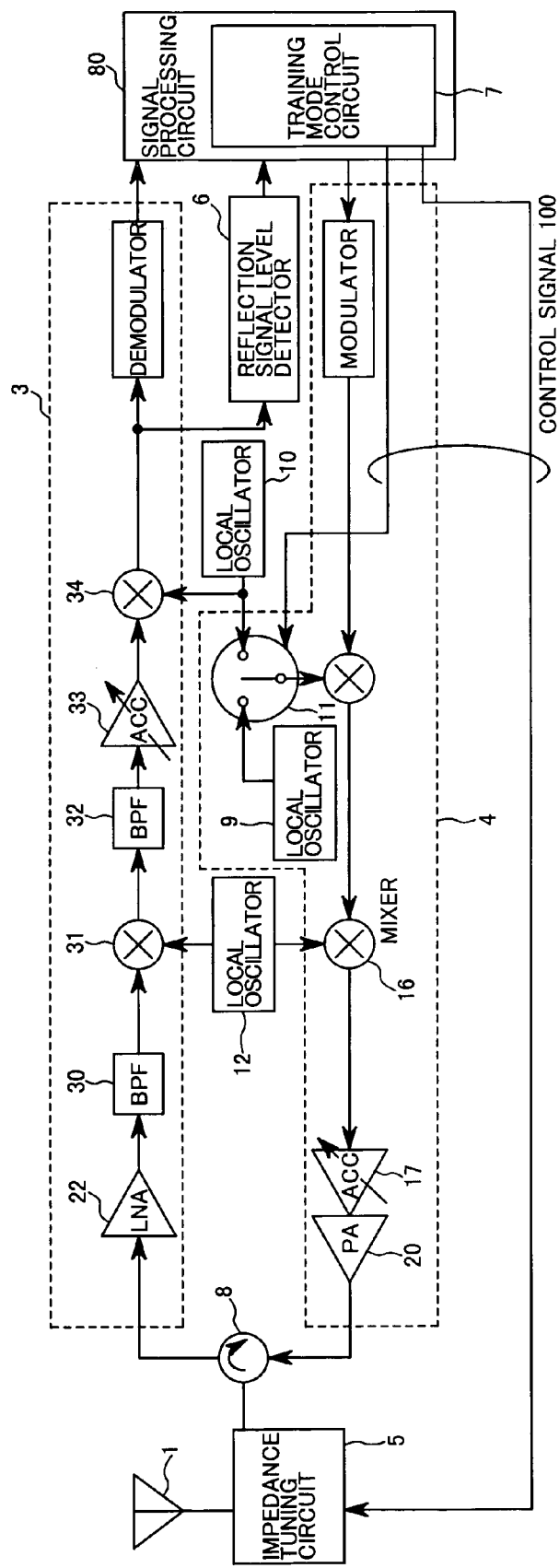
FIG. 5 is a block diagram showing an embodiment of the present invention.

Details and operation of a circuit configuration embodying one example of the basic configuration shown in FIG. 1 are described using an embodiment of FIG. 5. The antenna 1 is a patch antenna for transmitting and receiving dextrocircular polarized radio waves and a circulator 8 is used as a branching filter. In this embodiment, the communication terminal uses a transmission frequency of 5.835 or 5.845 GHz and uses corresponding receive frequencies of 5.795 or 5.805 GHz, respectively. A transmission frequency used in the training mode is 5.805 GHz, which is the same as a receive frequency in the proper communication mode, so that the communication terminal itself can set optimum receive sensitivity. The transmission frequency 5.805 GHz is obtained by using a local oscillator 9 and is selected as a frequency used in the training mode by the switch 11.

Next, the operation of the communication terminal of the present invention in the training mode is described in detail. In tuning a reflection signal level, the local oscillator 10 for outputting a transmission frequency in the normal communication mode is switched to the local oscillator 9 by the switch 11. A signal outputted from a power amplifier 20 is transmitted to the antenna 1 through the impedance tuning circuit 5 and is partially radiated as radio waves, but when impedance mismatch exists in the portion from the impedance tuning circuit 5 to the antenna 1, a part of the signal is reflected and comes back. The reflection signal is transmitted to the receiver by a circulator 8. Since the frequency of a signal coming back due to reflection is set identical with the proper receive frequency, the reflection signal is received by the receiver composed of an amplifier 22, band passage filters 30 and 32, mixers 31 and 34, and a gain control circuit 33, and its signal level is detected in the reflection signal level detector 6. Next, the detected reflection signal level is compared with a preset reference value in the training mode control circuit 7. At least one of the reflection signal level or an error signal, which is a difference between the reflection signal level and the reference value, is combined with an impedance value at that time and the combined value is stored in the training mode control circuit 7.

Next, a control signal for tuning impedance issued from the training mode control circuit 7 is sent to the impedance tuning circuit 5 through the control line 100 to change impedance. Thereafter, a reflection signal level is detected again by the reflection signal level detector 6. This operation is controlled by the training mode control circuit 7.

Figure 6:
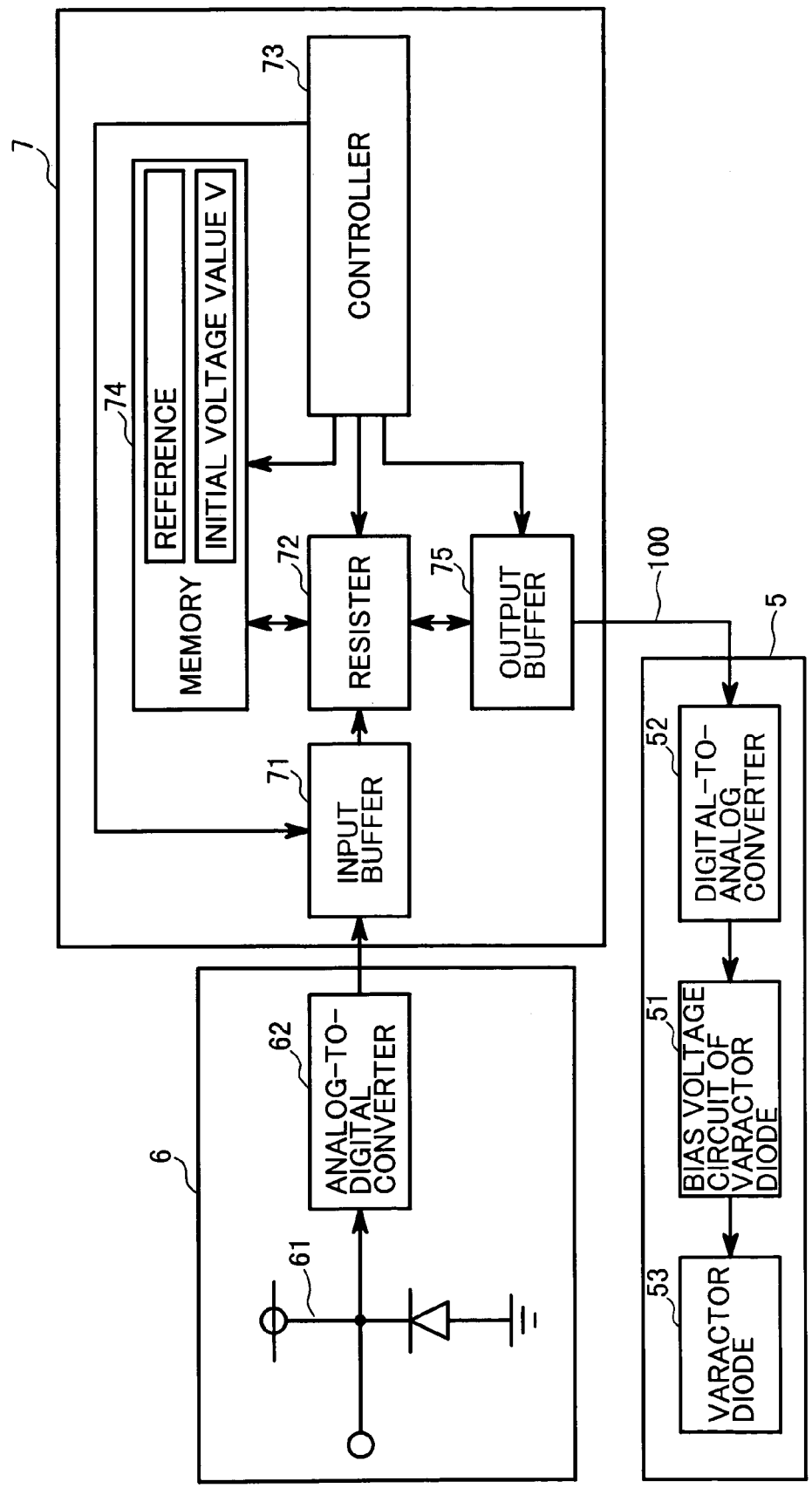
FIG. 6 is a circuit diagram showing a specific example of FIG. 5.

This series of operations are described in detail with reference to a circuit diagram shown in FIG. 6 as an example. In this example, the reflection signal level detector 6 is composed of a pin diode 6 for converting a reflection signal into a voltage, and an analog-to-digital converter 62. The training mode control circuit 7 is composed of an input buffer 71, a register 72, a controller 73, a memory 75, and an output buffer 75. The impedance tuning circuit 5 is composed of a digital-to-analog converter 52, a bias voltage circuit of varactor diode 51, and a varactor diode 53. Impedance is tuned by operations described below.

The initial value V of a voltage stored in the memory 74 is read into the register 72 from the memory 74. Next, the initial value V of the voltage is written to the output buffer 75. The initial value V of the voltage is converted to an analog voltage by the digital-to-analog converter 52, the bias voltage circuit of varactor diode 51 is driven by the voltage, and the above described voltage value is applied to the varactor diode 53. A reflection signal level at this time is detected by the reflection signal level detector 6. In other words, the reflection signal is converted to a DC voltage by the pin diode 61 and further converted to a digital signal by the analog-to-digital converter 62. A digital value of the reflection signal strength is inputted to the input buffer 71 within the training mode control circuit 7. The controller 73 directs the input buffer 71 to hold a reflection signal level. Next, a value of the input buffer 71 is read into the register 72. A set of the value of the reflection signal level read into the register 72, an error signal, which is a difference between the value of the reflection signal level and a reference value set in advance within the memory 74, and the value of an applied voltage to the varactor diode 53 is stored in the memory 74. A voltage resulting from changing from the initial voltage value V by an amount ΔV is calculated using the register 72 and written to the output buffer 75, and is applied to the bias voltage circuit of varactor diode 51, and the same operation as described above is performed. A set of the value of a reflection signal level at that time, an error signal, and an applied voltage to the varactor diode 53 is stored in the memory 74. The above operation is repeated in a range from the initial voltage value to a final voltage value that are stored in advance in the memory 74.

Next, the controller 73, register 72, and memory 74 are operated to search sets of reflection signal level values, error signals, and applied voltages to the varactor diode 53 stored in the memory 74 by the above described series of operations for the value of an applied voltage to the varactor diode 53 when a reflection signal level is the smallest. Or the value of an applied voltage to the varactor diode 53 when a reflection signal level is equal to or less than a predetermined tolerance value may be located in the same way as described above. Thereafter, the controller 73 transmits the value of an applied voltage to the varactor diode 53 to the output buffer 75 through the register 72. The voltage value is transmitted from the output buffer 75 to the bias voltage circuit of varactor diode 51 and an applied voltage to the varactor diode 53 is set to the voltage value. After impedance is thus tuned so that a reflection signal level is the smallest or equal to or less than the predetermined tolerance value, the training mode is terminated. Thereafter, according to the direction of the training mode control circuit 7, the switch 11 is driven to switch from the local oscillator 9 to the local oscillator 10.

The tuning of receive sensitivity of the terminal is thus terminated, the normal transmitter-receiver is driven to bring the communication terminal into communications with the main unit.

FIG. 5 shows an embodiment of a circuit configuration of the present invention. The circuit is limited to only this configuration; it goes without saying that objects of the present invention can be achieved if the circuit is configured so that a transmitting side can transmit the same frequency as a receive frequency and a reflection signal level can be evaluated.

For example, a bandpass filter may be inserted between elements of the circuit; although, in this embodiment, a transmit-receive signal is upconverted or downconverted in two stages, it may be upconverted or downconverted in one stage. The local oscillator 10 and the local oscillator 12 are shared between the transmitting side and the receiving side but may be provided separately for each of them.

Although, in the above example, an applied voltage to the varactor diode is automatically controlled by the circuit, it may be controlled by means (a voltage control, etc.) capable of manually changing the applied voltage. In this case, an indication means is preferably provided which indicates that an applied voltage has been set within an optimum range.

Figure 7:
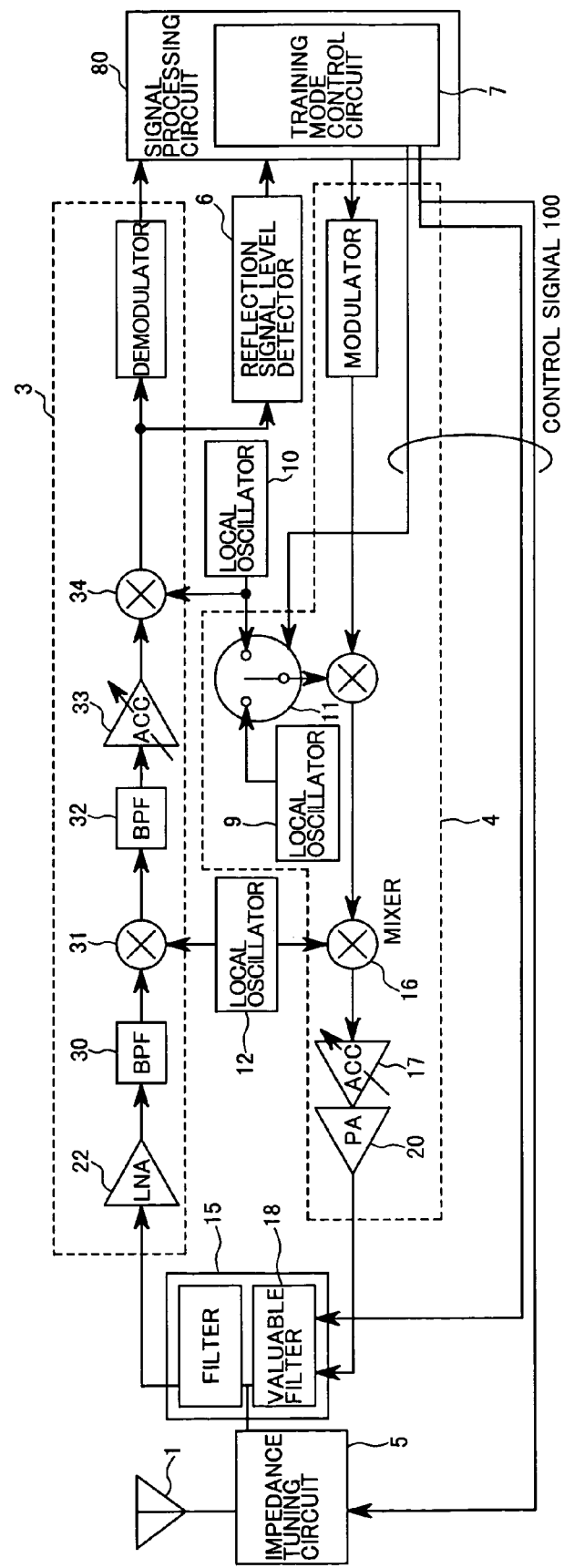
FIGS. 7 and 8 are respectively block diagrams showing other embodiments of the present invention.

Next, a circuit configuration of the present invention in another embodiment is described using FIG. 7. In the embodiment of FIG. 7, as in the first embodiment shown in FIG. 5, the communication terminal uses a transmission frequency of 5.835 or 5.845 GHz and uses corresponding receive frequencies of 5.795 or 5.805 GHz, respectively. The antenna 1 is a patch antenna for transmitting and receiving dextrocircular polarized radio waves. Although a basic circuit configuration and operation of the communication terminal are the same as in those in the first embodiment, a duplexer 15 is used as a branching filter.

Therefore, the present invention uses a variable filter 18, as a transmission filter of the duplexer, which allows the passage of signals having a frequency of 5.805 GHz during the training mode, and signals having transmission frequencies of 5.835 and 5.845 GHz during normal communications. The bands of the variable filter 18 are switched according to signals from the training mode control circuit 7.

Figure 8:
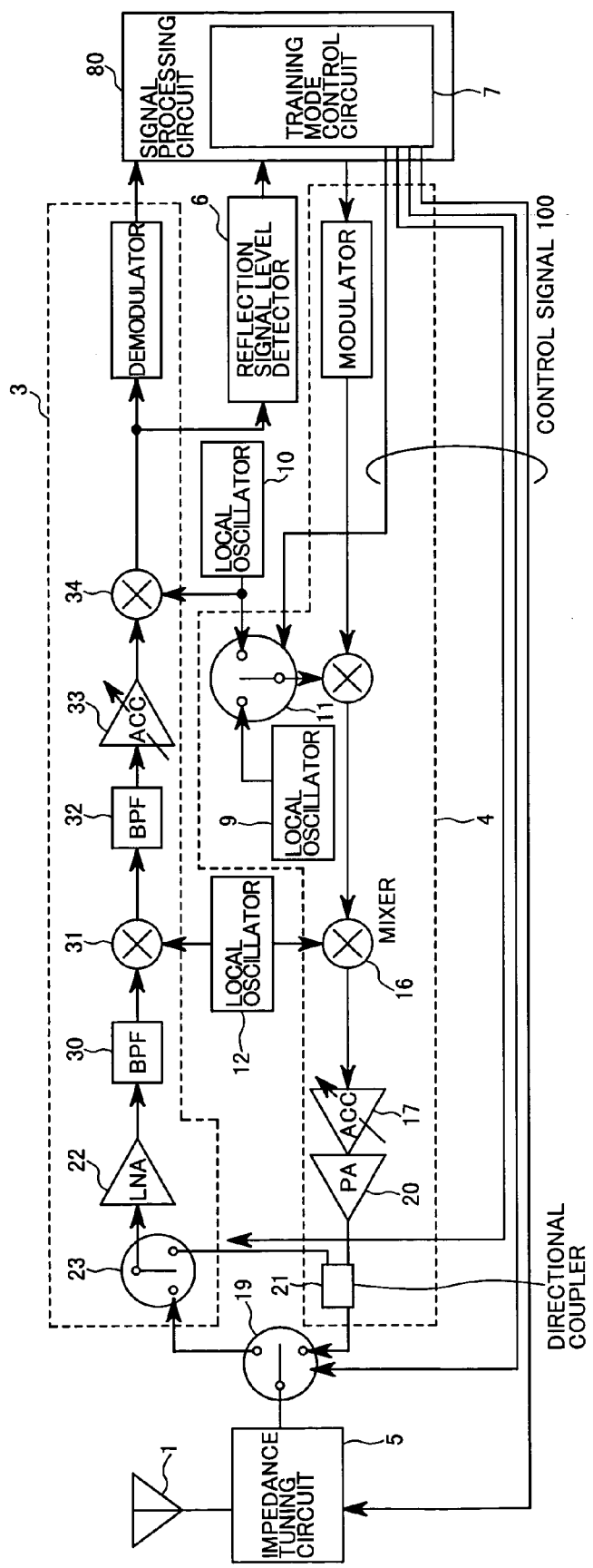

Next, a circuit configuration and operation of the present invention in further another embodiment are described using FIG. 8. Although an outline of operation in this embodiment is the same as that in the embodiment shown in FIG. 5 and that in the embodiment shown in FIG. 7, in this embodiment, a switch 19 is used as a branching filter.

In this embodiment, a local oscillator 9 newly provided as in the two embodiments described previously allows the transmitting side to also transmit the same frequency as a receive frequency. However, in this embodiment, since the switch 19 is used to switch between transmission and reception, a directional coupler 21 is inserted between the switch 19 at the transmitter side and the power amplifier 20 to direct a reflection signal to the receiver so that a reflection signal from the directional coupler 21 is inputted to the amplifier 22 at the receiver side. In this embodiment, a switch 23 is provided between the amplifier 22 and the switch 19 for switching between transmission and reception so that signals from the directional coupler 21 are inputted to the amplifier 22 during the tuning of reflection levels, and the switch 19 and the amplifier 22 are connected with each other after the tuning of receive sensitivity terminates. At least three switches 11, 19, and 23 are used in this embodiment, and can be switched in conjunction with one another by the training mode control circuit 7 according to commands from the signal processing circuit 80.

Although, in this embodiment, the directional coupler 21 is always inserted between the power amplifier 20 at the transmission side and the switch 19 for switching between transmission and reception, the directional coupler may be inserted only during the tuning of reflection levels.

As has been described above, if the circuit configuration of the communication terminal of the present invention is set to be the same as the configurations shown in FIGS. 5, 7, and 8 or to be similar to them, the communication terminal can detect a reflection signal level by itself to set optimum receive sensitivity.

In the embodiments of the configurations shown in FIG. 1 and FIGS. 5 to 8, impedance is tuned by providing the impedance tuning circuit 5 between the antenna 1 and the branching filter 2. However, where an antenna whose impedance can be tuned is used, the impedance tuning circuit may not be provided, and if impedance of the antenna is tuned by using the same methods as in the foregoing embodiments so that a reflection level at an input end of the antenna is the smallest or equal to or less than a predetermined tolerance value, the same effects can be apparently obtained. Likewise, each time antenna impedance is changed, a reflection signal level is detected and stored and held, and after termination of a series of operations, impedance at the time of the smallest of the stored and held reflection signal levels or a level equal to or less than a predetermined tolerance value is taken out, the antenna whose impedance may be controlled to be set with the impedance value.

Figure 9A:
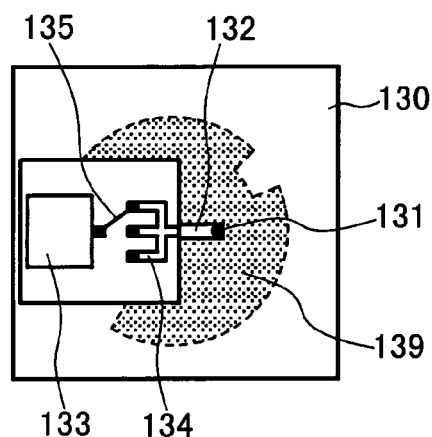
FIGS. 9A and 9B are respectively a plan view and a partially sectional view showing specific examples of an impedance changing technique in the case where an impedance tuning circuit is provided in the present invention.
Figure 9B:
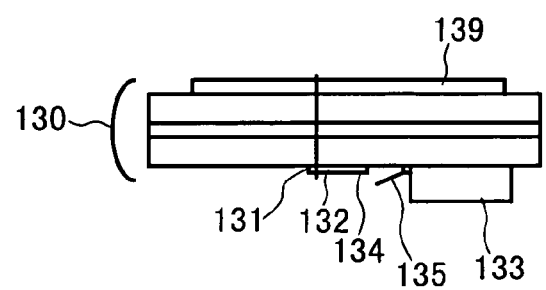
Figure 10A:
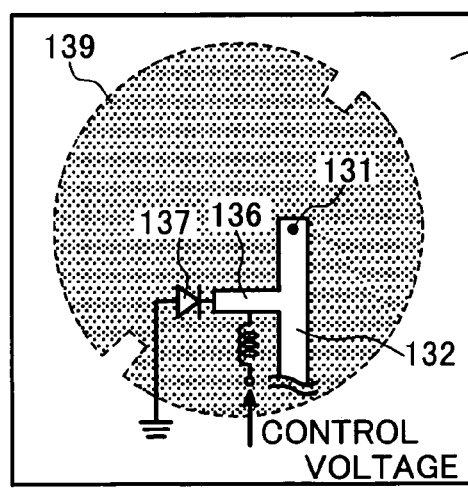
FIGS. 10A and 10B are respectively a plan view and a partially sectional view showing other specific examples of the impedance changing technique in the case where an impedance tuning circuit is provided in the present invention.
Figure 10B:
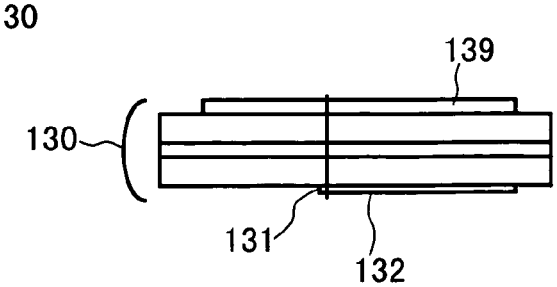

Specific examples of a method of changing impedance when the impedance tuning circuit is used are described using FIGS. 9 and 10. FIGS. 9A and 10A are plan views of the respective specific examples, and FIGS. 9B and 10B are the respective partially sectional views of them. An example of FIG. 9 shows a flat patch antenna 130 fabricated using a substrate formed of three-layer copper foil and two-layer dielectric. Copper foil of the first layer is used as a radiation surface, the second layer as a bottom board, and the third layer as a feeding wiring. The patch antenna of this embodiment is formed to feed power through a via hole from a back side. On the back side of the patch antenna is put a transmitter-receiver module 133 provided with MMIC (Monolithic Microwave Integrated Circuit). Although a feeding point 131 and the transmitter-receiver module 133 are connected using a feeding wiring 132 formed of a 50-ohm microstrip line, an inter-stage matching circuit is provided as an impedance tuning circuit between the feeding wiring 132 and the transmitter-receiver module 133. The inter-stage matching circuit is composed of plural types of λ/4 converters 134. Reflection signal levels at different points are detected while switching the λ/4 converters by a switch 135, and a λ/4 converter when the smallest reflection signal level is observed is selected to conduct communications with the main unit.

Next, an example shown in FIG. 10 is described. In this example, as an antenna, the same patch antenna as in the example of FIG. 9 is used. A stub 136 is provided at a part of the feeding wiring 132 connecting the feeding point 131 to the patch antenna and a transmitter-receiver not shown in the drawing, a varactor diode 137 is provided at a tip of the stub 136, and the capacity of the varactor diode 137 is controlled by a control voltage sent from the training mode control circuit to tune impedance. Although, in the example of FIG. 10, the stub 136 and the varactor diode 137 are provided at a part of the feeding wiring 132 formed on copper foil of the third layer of the antenna substrate, it is apparent that a stab and a varactor diode may be provided in a feeding wiring provided at the transmitter-receiver side.

Specific examples of a method of changing impedance of an antenna whose impedance can be tuned are described using FIGS. 11, 12, 13, and 14.

Figure 11A:
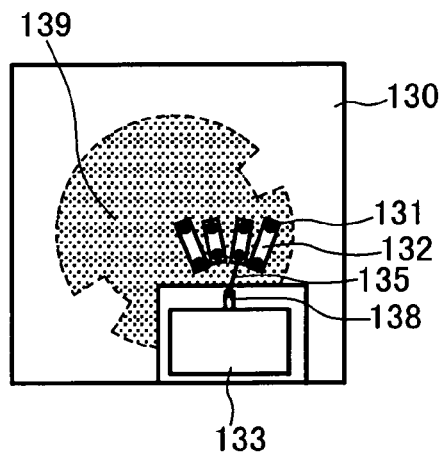
FIGS. 11A and 11B are respectively a plan view and a partially sectional view showing specific examples of the impedance changing technique of antenna in the present invention.
Figure 11B:
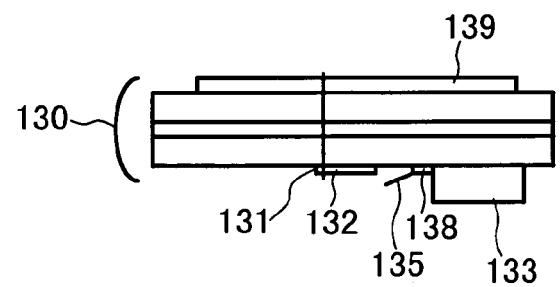

First, from an embodiment shown in FIG. 11, a method of changing antenna impedance is described. FIGS. 1A and 1B are a plan view and a partially sectional view, respectively. Like the embodiment of FIG. 9, a patch antenna is used as an antenna and power is fed through a via hole from the back side thereof. The patch antenna generally has impedance of 0 at the central part of patch and the highest impedance at ends of patch. Impedance values change depending on a matter in front of the antenna. Therefore, the patch antenna is beforehand provided with plural feeding points, and if they are switched by a switch or the like, the impedance of the patch antenna can be changed. In this embodiment, since antenna impedance can be tuned by changes in the feeding points of the antenna, an impedance tuning circuit need not be provided. FIG. 11 shows four sets of feeding wirings 132 each comprising a feeding point and a microstrip line, provided using via holes on the back side of the patch antenna. In this embodiment, the transmitter-receiver module 133 is put on the back side of the patch antenna. As shown in FIG. 11, connections between the four feeding wirings 132 and a feeding wiring in the transmitter-receiver module 133 are switched by the switch 135 so that impedance between the patch antenna and the transmitter-receiver module can be changed. Therefore, while switching the feeding points by the switch, the levels of reflection signals from the switch are detected, and a feeding point at which reflection signal levels become the smallest is used so that optimum communications with the main unit can be conducted. In this embodiment, the switch portion is regarded as an input end of the antenna.

Figure 12:
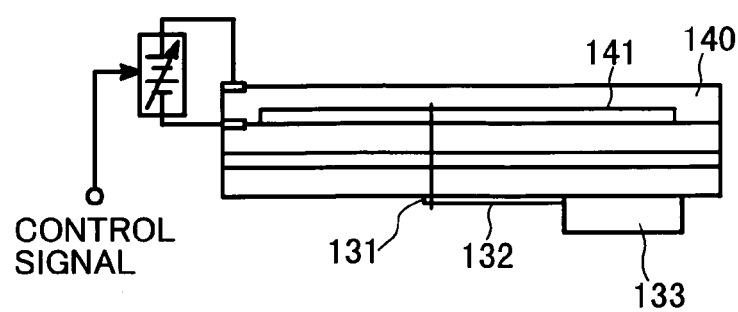
FIGS. 12 and 14 are respectively diagrams showing other specific examples of the impedance changing technique of antenna in the present invention.

Another specific example of a method of changing antenna impedance is described using FIG. 12. In this embodiment, a dielectric 140 such as liquid crystal whose specific dielectric constant changes depending on the value of an applied voltage is stacked on the radiation surface 141 of the patch, and an applied voltage to the dielectric 140 is controlled to change antenna impedance. Also in this case, direct changing of antenna impedance eliminates the need to provide an impedance tuning circuit between the antenna and the transmitter-receiver. Therefore, in such a case, reflection signal levels detected in the training mode are the levels of reflection waves from an input end of the antenna.

Figure 13:
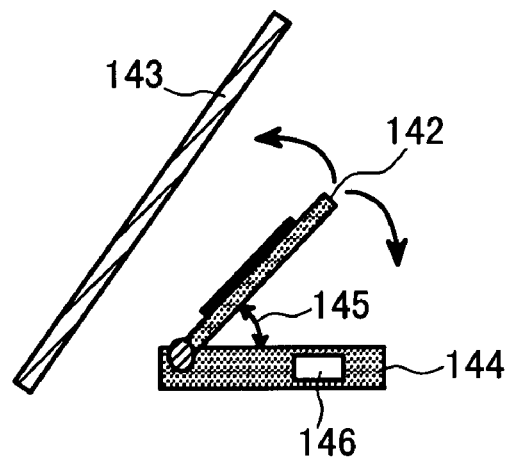
Figure 14:
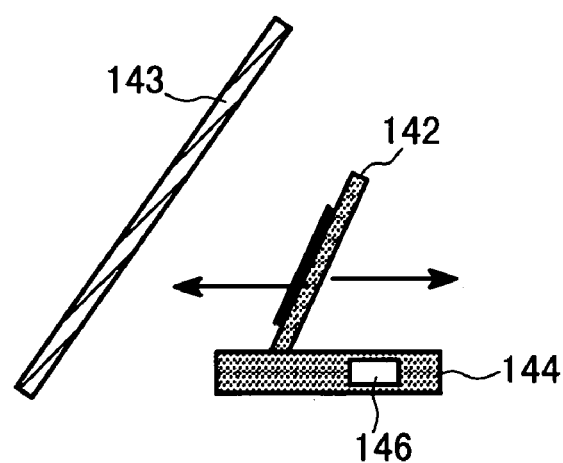

Further another specific example of a method of changing antenna impedance is described using FIGS. 13 and 14. In this example, antenna impedance is changed by changing a distance between the antenna and a matter existing in front of it, for example, a distance from the antenna 142 to front glass 143. Since antenna impedance when viewed from the feeding points changes depending on a distance from the antenna to the front glass, antenna impedance can be changed by changing a distance from the antenna to the front glass 143. Hence, as shown in FIG. 13, by changing an angle 145 between a seat 144 fixing the antenna 142 and the antenna 142 by using a driving apparatus 146, a distance to the front glass 143 may be changed, or as shown in FIG. 14, by back and forth moving the antenna 142 on the seat 144 supporting the antenna 142, a distance to the front glass 143 may be changed. As a driving apparatus for moving the antenna, for example, a motor or the like may be used, or driving may be manually caused.

In this embodiment, direct changing of antenna impedance eliminates the need to provide an impedance tuning circuit between the antenna and the transmitter-receiver. Accordingly, in such a case, reflection signal levels detected in the training mode are the levels of reflection waves from an input end of the antenna.

Although a one-patch antenna having one radiation conductor is shown in the drawings describing the foregoing embodiments, it goes without saying that the present invention does not limit an antenna to this type of antenna and an array antenna with plural patches arranged may be formed. It is also apparent that two or more antennas may be used to provide spatial diversity functions. A transmitting antenna and a receiving antenna may be provided individually.

Figure 15:
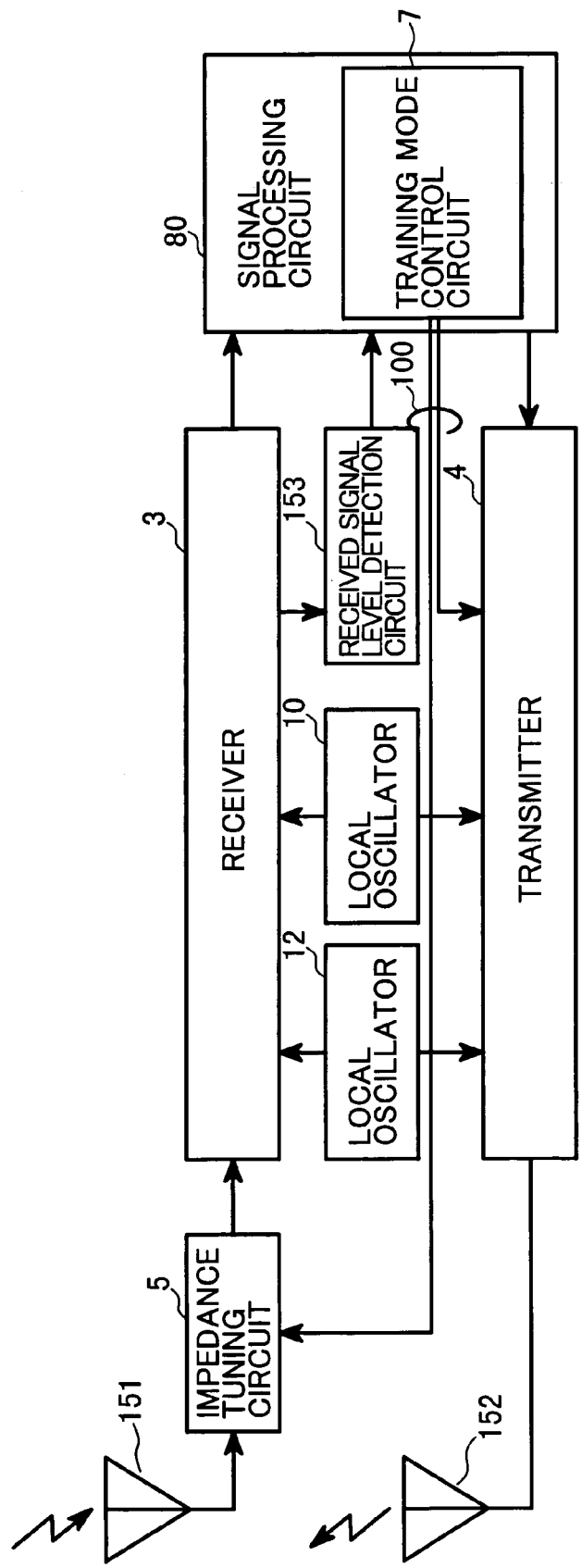
FIG. 15 is a block diagram showing further other embodiment of the present invention.

The foregoing descriptions have been made of the embodiments tuning receive sensitivity by detecting reflection signal levels from an antenna input end or an input end of an impedance tuning circuit. Receive sensitivity is tuned not only by the above described method employing reflection signal levels, but also by a method tuning antenna impedance or the impedance of an impedance tuning circuit so that an antenna's receive level becomes the largest or a level equal to or greater than a predetermined tolerance value. An embodiment by this method is described below using FIG. 15.

In this embodiment, the communication terminal includes a transmitting antenna 152 and a receiving antenna 151. Like the embodiments having been so far described, in the training mode, the transmitter 4 transmits signals of the same frequency as a receive frequency in the normal communication mode. A radio wave from the transmitting antenna 152 is received in the receiving antenna 151, a receive level of the radio wave is detected by a receive level detecting circuit 153, and the impedance tuning circuit 5 is tuned based on the detection result so that a receive level becomes the largest or a level equal to or greater than a predetermined tolerance value. Although the impedance tuning circuit 5 is provided in this embodiment, like the embodiment having been so far described, for an antenna whose impedance is tuned, the circuit may be configured so as to tune antenna impedance.

Also in this embodiment, like the embodiment having been so far described, a receive level is detected each time impedance of the impedance tuning circuit or impedance of an antenna whose impedance can be tuned changes, an impedance value at the time of the largest receive level or a receive level equal to or greater than a predetermined tolerance value is taken out, and the impedance tuning circuit or the antenna whose impedance can be tuned may be controlled based on the impedance value.

Figure 16:
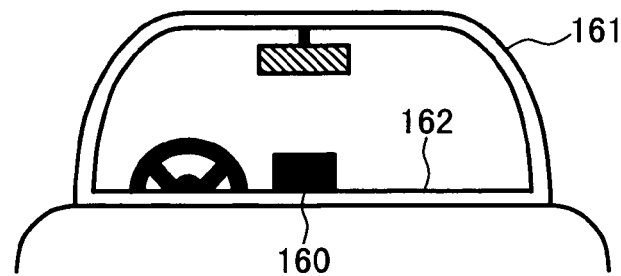
FIGS. 16 and 17 are respectively diagrams showing application examples of the present invention.
Figure 17:
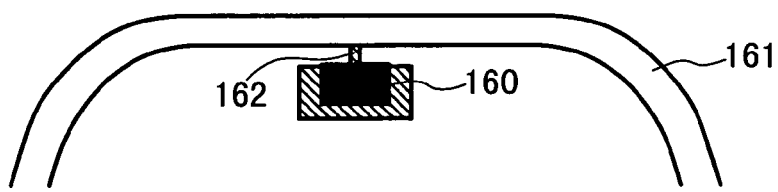
Figure 18:
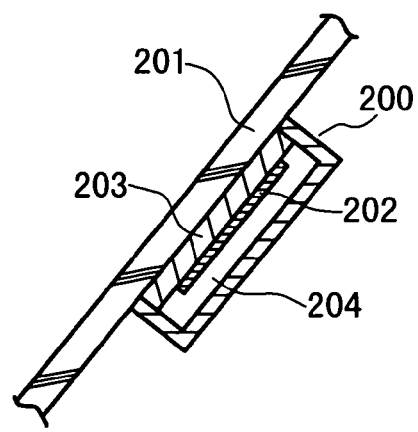
FIG. 18 is a diagram showing a conventional example.

Next, an example of application of a communication terminal of the present invention to an automobile is described using FIG. 16. The communication terminal of the present invention has a function for conducting training so that satisfactory receive sensitivity is obtained, regardless of environments in which the communication terminal is located. Accordingly, the communication terminal 160 may be located anywhere on a dashboard 162 of an automobile 161 as shown in FIG. 16, or attached to a back mirror supporter 163 as shown in FIG. 17. Although not shown in a drawing, it may be stuck to any place by using a mounting jig or the like.

As has been described in detail above, according to the present invention, regardless of peripheral environments in which the communication terminal is located, the communication terminal enables communications with optimum receive sensitivity at any time. Consequently, users can locate the communication terminal in any desired location for all automobiles and all models of automobiles as an inexpensive communication terminal capable of highly precise communications.

The communication terminal of the present invention, which is useful as a communication terminal for automobile in the Intelligent Transport System such as the Electric Toll Collection System and the Road/Automobile Communication System, suppresses receive sensitivity deterioration resulting from changes in peripheral environments in which the communication terminal is located, by tuning antenna impedance or the impedance of the impedance tuning circuit so that communications can be precisely conducted with optimum receive sensitivity at any time. Thus, the communication terminal has great potentiality in industrial use.

What is claimed is:

1. A communication terminal including a circuit for transmitting and receiving radio waves, said circuit for transmitting and receiving radio waves comprising a control signal processing circuit for conducting a training mode for tuning receive sensitivity,
    wherein the communication terminal activates the training mode when the communication terminal is powered on, and switches to a normal communication mode after tuning of receive sensitivity,
    in the normal communication mode, said circuit for transmitting and receiving radio waves transmits radio waves at a transmission frequency and receives radio waves at a receive frequency different from the transmission frequency, and
    the tuning of receive sensitivity is conducted by using a reflection signal having a frequency identical with the receive frequency in the normal communication mode as well as detecting and tuning a reflection signal level thereof.

2. The communication terminal according to claim 1, wherein, in the training mode, the reflection signal is obtained by generating then transmitting a signal having a frequency identical with the receive frequency via said circuit for transmitting and receiving radio waves.

3. The communication terminal according to claim 2, wherein the wave is transmitted by connecting a receive-use local oscillator of the communication terminal to one of the transmit/receive circuit and the transmitter-receiver.

4. A communication terminal including a transmit/receive circuit having an antenna and a transmitter-receiver, said transmit/receive circuit comprising a control signal processing circuit for conducting a training mode for tuning receive sensitivity, and switching means for switching between the training mode and a normal communication mode, wherein the communication terminal activates the training mode when the communication terminal is powered on, and switches to normal communication mode after tuning of receive sensitivity, in the normal communication mode, said transmit/receive circuit transmits radio waves at a transmission frequency and receives radio waves at a receive frequency different from the transmission frequency, and the tuning of receive sensitivity is conducted by using a reflection signal having a frequency identical with the receive frequency in the normal communication mode as well as detecting and tuning a reflection signal level thereof.

5. The communication terminal according to claim 4, wherein the control signal processing circuit comprises:

impedance tuning means provided between the antenna and the transmitter-receiver;

means for transmitting a wave for detecting a reflection level of a reflection signal from an input end of the impedance tuning means;

means for detecting a reflection level of the reflection signal; and means for controlling impedance tuning of the impedance tuning means, based on the reflection level.

6. The communication terminal according to claim 5, comprising:

a circuit for capturing a reflection signal or part thereof of the wave for detecting a reflection level into a receive system; and an oscillator for transmitting a wave used in the normal communication mode.

7. The communication terminal according to claim 5, wherein the impedance tuning means is configured around a varactor diode provided between the antenna and the transmitter.

8. The communication terminal according to claim 5, wherein the impedance tuning means is configured around an inter-stage matching circuit including a λ/4 converter.

9. The communication terminal according to claim 5, wherein, in the training mode, the reflection signal is obtained by generating then transmitting a signal having a frequency identical with the receive frequency via said circuit for transmitting and receiving radio waves.

10. The communication terminal according to claim 4, wherein the control signal processing circuit comprises:

means for tuning impedance of the antenna;

means for transmitting a wave for detecting a reflection level of a reflection signal from an input end of the antenna;

means for detecting a reflection level of the reflection signal; and means for controlling impedance tuning of the antenna, based on the reflection level, wherein the impedance of the antenna is tuned by changing impedance at an input end of the antenna.

11. The communication terminal according to claim 10, wherein the impedance tuning means is configured using changes in specific dielectric constant of a dielectric provided in the antenna.

12. The communication terminal according to claim 10, wherein the impedance tuning means is configured using changes in the positions of the antenna.

13. The communication terminal according to claim 10, wherein, in the training mode, the reflection signal is obtained by generating then transmitting a signal having a frequency identical with the receive frequency via said circuit for transmitting and receiving radio waves.

14. The communication terminal according to claim 4, wherein the control signal processing circuit comprises:

impedance tuning means provided between the antenna and the transmitter-receiver;

means for transmitting a wave for detecting a receive level of a receive signal of the antenna;

means for detecting a receive level of the receive signal; and means for controlling impedance tuning of the impedance tuning means, based on the receive level.

15. The communication terminal according to claim 14, wherein, in the training mode, the reflection signal is obtained by generating then transmitting a signal having a frequency identical with the receive frequency via said circuit for transmitting and receiving radio waves.

16. The communication terminal according to claim 4, wherein the control signal processing circuit comprises:

means for turning impedance of the antenna; means for transmitting a wave for detecting a receive level of a receive signal of the antenna;

means for detecting a receive level of the receive signal; and means for controlling impedance tuning of the antenna, based on the receive level, and wherein the impedance of the antenna is tuned by changing impedance at an input end of the antenna.

17. The communication terminal according to claim 16, wherein, in the training mode, the reflection signal is obtained by generating then transmitting a signal having a frequency identical with the receive frequency via said circuit for transmitting and receiving radio waves.

18. The communication terminal according to claim 4, wherein the antenna is a patch antenna for transmitting and receiving dextrocircular polarized radio waves.

19. The communication terminal according to claim 4, wherein, in the training mode, the reflection signal is obtained by generating then transmitting a signal having a frequency identical with the receive frequency via said circuit for transmitting and receiving radio waves.

20. A communication terminal including a transmit/receive circuit having an antenna and a transmitter-receiver, comprising a control signal processing circuit for conducting a training mode for tuning receive sensitivity, and switching means for switching between the training mode and a normal communication mode, wherein the communication terminal activates the training mode when the communication terminal is powered on, and switches to normal communication mode after tuning of receive sensitivity, wherein the control signal processing circuit comprises:

means for tuning impedance of the antenna; means for transmitting a wave for detecting a reflection level of a reflection signal from an input end of the antenna;

means for detecting a reflection level of the reflection signal; and means for controlling impedance tuning of the antenna, based on the reflection level, and wherein the impedance tuning means is configured using switching of feeding points of the antenna.

21. A communication terminal for automobile including a transmit/receive circuit having an antenna and a transmitter-receiver, wherein the communication terminal comprises training means for conducting a training mode for tuning receive sensitivity, and switching means for switching between the training mode and a normal communication mode, activates the training mode when the communication terminal is powered on, and switches to the normal communication mode after tuning of receive sensitivity, in the normal communication mode, said transmit/receive circuit transmits radio waves at a transmission frequency and receives radio waves at a receive frequency different from the transmission frequency, and the tuning of receive sensitivity is conducted by using a reflection signal having a frequency identical with the receive frequency in the normal communication mode as well as detecting and tuning a reflection signal level thereof.

22. A communication terminal for automobile according to claim 21 which selectively activates the training mode after the switching to the normal communication mode, wherein the training mode is configured to be arbitrarily activated as directed by a communication terminal user.

23. The communication terminal for automobile according to claim 21, tunes the receive sensitivity every specified time interval after switching to the normal communication mode.

24. An automobile comprising the communication terminal which includes a transmit/receive circuit having an antenna and a transmitter-receiver, said transmit/receive circuit comprising a control signal processing circuit for conducting a training mode for tuning receive sensitivity, and switching means for switching between the training mode and a normal communication mode, wherein the communication terminal activates the training mode when the communication terminal is powered on, and switches to the normal communication mode after tuning of receive sensitivity, in the normal communication mode, said transmit/receive circuit transmits radio waves at a transmission frequency and receives radio waves at a receive frequency different from the transmission frequency, and the tuning of receive sensitivity is conducted by using a reflection signal having a frequency identical with the receive frequency in the normal communication mode as well as detecting and tuning a reflection signal level thereof.

25. A communication terminal including means for transmitting and receiving radio waves, training means for conducting a training mode for tuning receive sensitivity, wherein the communication terminal selectively activates the training mode when the communication terminal is powered on, and switches to a normal communication mode after tuning of receive sensitivity, in the normal communication mode, said means for transmitting and receiving radio waves transmit radio waves at a transmission frequency and receive radio waves at a receive frequency different from the transmission frequency, the tuning of receive sensitivity is conducted by using a reflection signal having a frequency identical with the receive frequency in the normal communication mode as well as detecting and tuning a reflection signal level thereof, and the training mode is configured to be arbitrarily activated as directed by a communication terminal user.

* * * * *